United States Patent [19]
Goodhue, Jr. et al.

[11] Patent Number: 5,407,909
[45] Date of Patent: Apr. 18, 1995

[54] EARTH SUPPORT FLUID COMPOSITION AND METHOD FOR ITS USE

[75] Inventors: K. Gifford Goodhue, Jr., Spring; Max M. Holmes, Dallas, both of Tex.

[73] Assignee: KB Technologies, Ltd., Spring, Tex.

[21] Appl. No.: 20,345

[22] Filed: Feb. 19, 1993

Related U.S. Application Data

[63] Continuation-in-part of Ser. No. 914,441, Jul. 15, 1992, abandoned.

[51] Int. Cl.⁶ .............................................. C09K 7/02
[52] U.S. Cl. ..................... 507/118; 507/119; 507/121; 507/122; 507/903; 507/225; 507/221; 507/228
[58] Field of Search ............... 252/8.551, 315.1, 315.4; 507/118, 119, 122, 121

[56] References Cited

U.S. PATENT DOCUMENTS

| | | | |
|---|---|---|---|
| Re. 29,716 | 8/1978 | Clampitt et al. | 175/65 |
| 2,718,516 | 9/1955 | Bortnick | |
| 2,798,053 | 7/1957 | Brown | |
| 2,812,161 | 11/1957 | Mayhew | |
| 3,040,820 | 6/1962 | Gallus | 175/66 |
| 3,826,771 | 7/1974 | Anderson et al. | |
| 4,075,411 | 2/1978 | Dickstein | |
| 4,076,628 | 2/1978 | Clampitt | 252/8.5 |
| 4,282,928 | 8/1981 | McDonald et al. | 166/274 |
| 4,293,427 | 10/1981 | Lucas et al. | |
| 4,374,738 | 2/1983 | Kelley | |
| 4,374,739 | 2/1983 | McLaughlin et al. | |
| 4,375,533 | 3/1983 | Park et al. | |
| 4,500,436 | 2/1985 | Pabley | 252/8.5 |
| 4,509,949 | 4/1985 | Huang et al. | |
| 4,616,074 | 10/1986 | Ruffner | |
| 4,656,205 | 4/1987 | Walker et al. | |
| 4,745,154 | 5/1988 | Ruffner | |
| 4,898,611 | 2/1990 | Gross | |
| 4,946,605 | 8/1990 | Farrar et al. | |
| 4,980,434 | 12/1990 | Farrar et al. | |
| 5,006,596 | 4/1991 | Chen et al. | |
| 5,077,021 | 12/1991 | Polizzotti | |

FOREIGN PATENT DOCUMENTS

| | | |
|---|---|---|
| 0200062 | 11/1986 | European Pat. Off. |
| 0273210 | 7/1988 | European Pat. Off. |
| 2647463 | 11/1990 | France |
| 2221940A | 2/1990 | United Kingdom |

OTHER PUBLICATIONS

Hooks, J. M. et al, *The Design & Construction of Diaphragm Walls in Western Europe 1979*, Supplement to 1980 World Survey of Current Research & Development on Roads & Road Transport, DEc. 1990.

Tamaro, G., *Slurry Wall Technical Course*, Resource Management Projects, Apr. 19 & 20, 1976.

*Bencor Processes*, Bencor Corporation of America, 2315 Southwell Rd., Dallas, Tex., 75229.

*Bored Piles, Les Pieux Fores*, U.S. Dept. of Transportation Report No. FHWA-TS-86-206, Apr. 1986.

Kheng, H. Y., *Rheological and Physico-Chemical Properties of Palygorskite Clay and Anionic Polymer Slurries Used in Drilling Shaft Construction*, A Dissertation Presented to the Univ. of Florida, 1989.

Carnicom, W. M., *A Systems Approach for the Solution of Mud Problems*, NL Baroid/NL Industries, Inc., 1982.

*Manual of Drilling Fluids Technology; Fundamental Characteristics of Drilling Fluids*, NL Baroid/NL Industries, Inc., 1985.

*Manual of Drilling Fluids Technologies; Calculation, Charts, and Tables for Mud Engineering*, NL Baroid/NL Industries, Inc. 1985.

(List continued on next page.)

Primary Examiner—Gary Geist
Attorney, Agent, or Firm—Arnold, White & Durkee

[57] ABSTRACT

This invention relates to a method for preparing and earth stabilization fluid, a method for using such an earth stabilization fluid and to the earth stabilization fluid itself. This invention uses a continuous phase that has been added to a borehole and a polymer material that forms gel masses having desired functional properties when added to the continuous phase.

9 Claims, 8 Drawing Sheets

OTHER PUBLICATIONS

Gray, G. R., *Drilling with Mud; Simple Tests Save Time and Money*, Baroid Division, NL Industries, Inc.

Gray, G. R., *Right Drilling Fluid Key to Efficient Operation*, Mining Industry, Baroid Division, NL Industries, Inc.

*Bentonite-Extended Muds (Ben-Ex)*, N.L. Baroid/NL Industries, Inc.

*Drilling Fluids Products Cross Reference Chart*, NL Baroid/NL Industries, Inc.

*Formulation and Properties of "Standard" Muds for CST Fluids Optimization Tests*, NL Baroid/NL Industries, Inc.; Jan. 9, 1990.

Fisk, J. & Perez, J., *Filtration Studies to Determine Filter Cake Compressibilities for Sun Oil's EZ-Mud Fluid*, NL Baroid/NL Petroleum Services, Inc., Fluids Research & Development Technical and Analytical Services/Support; EMB-4305; Jan. 29, 1988.

Gray, G. R., *Plan the Mud Program to Reduce Exploration Cost*, Mining Industry, Baroid Division, National Lead Co., Houston, Tex.

Basic Guidelines for Running NL Baroid's EZ-Mud Polymer System, NL Baroid/NL Industries, Inc.

*Clay Chemistry*, NL Baroid/NL Industries, Inc., Jun. 19, 1989.

*Manual of Drilling Fluids Technology; Sources of Mud Problems*, NL Baroid/NL Industries, Inc., 1985.

Liao, W. A. et al., *Adsorption Characteristics of PHPA on Formation Solids*, Baroid Drilling Fluids, Inc., 1990 IADS/SPE Drilling Conference, Houston, Tex., Feb. 27-Mar. 2, 1990.

Fisk, J. V. et al, *Physical Properties of Drilling Fluids at High Temperatures and Pressures*, Baroid Drilling Fluids, SPE Drilling Engineering, Dec. 1989.

*Drilling Specialties Company Product Literature*, Drilling Specialties Co., 1981.

*Polymer Drilling Systems Product Literature*, PDSCO, El Dorado, Ark.

*EnviroTrench/GSP Product Literature*, Synthetic Polymers for Drilling and Trenching, Technical Information, Pelham, N.Y.

Burland, J. B. et al, *Piling and Deep Foundations*, Proceedings of the International Conference and Piling and Deep Foundations, London, May 15-18, 1989; A. A. Balkema/Rotterdam/Brookfield, 1989.

*Baroid Drilling Fluids Product Literature*, NL Baroid/NL Industries, Inc.

*Cassion Load Test Results, Residual Treatment Facilities, Phase I, Deer Land, MA*, GZA GeoEnvironmental, Inc., New Upperton Falls, Mass; Jun. 1992; File No. 12553.2.

Holcombe, R. F. et al, *Subsidence of the Houston/Galveston Area*, McClelland Engineers, Spring, 1980.

Reese, L. C., *Drilled Piers in Rock*, 1989.

Turner, J. et al, *Drained Uplift Capacity of Drilled Shafts Under Repeated Axial Loading*.

Kulhawy, F. H., *Drilled Shaft Foundations*, Cornell Univ., Ithaca, N.Y., 1989.

Garrison, A. D. et al, *Dispersion of Clay and Shales by Fluid Motion*, Galveston Meeting, 1939.

Inoue, T. et al, *An Investigation of Shear Strength of Slurry Clay*, Japanese Society of Soil Mechanics and Foundation Engineering, Dec. 1990.

*Excerpt from Specification for Foundations Contract, Stage II, West Gate Freeway*, Federation of Piling Specialists.

Fearenside, G. R. et al, *The Skin Friction of Bored Piles Formed in Clay Under Bentonite*, Construction Industry Research and Information Association, London.

Tan, T. S. et al, *Behavior of Clay Slurry*, Japanese Society of Soil Mechanics and Foundation Engineering, Dec. 1990.

Tan, T. S. et al, *Sedimentation of Clayey Slurry*.

O'Neill, M. W., *Side Load Transfer in Driven and Drilled Piles*, Mar. 1984.

Felio, G. Y. et al, *A New Rod Shear Device for the Measurement of the Degradation of Soil-Pile Interfaces*, University of California at Los Angeles, Presented at 21st Annual OTC in Houston, Tex., May 14, 1989.

O'Neill, M. et al, *Effects of Stratigraphic and Construction Details on the Load Transfer Behavior of Drilled Shafts*, Transportation Research Board, 71st Annual Meeting, Jan. 12-16, 1992, Washington, D.C.

Tan, M. J. C. et al, *Estimation of Side Resistance of Compressible Piles in a Softening Medium*, Australian Geomechanics, Oct. 1991.

Cooke, R. W., *Load Transfer from Bored Clay-In-Situ Piles in London Clay*, 1979.

Johnston, I. W., *New Developments in the Prediction of*

(List continued on next page.)

OTHER PUBLICATIONS

*Side Resistence of Piles in Soft Rock,* Monash University, Melbourne.

Johnston, I. W. et al, *Side Resistance of Piles in Weak Rock,* Monash University, Melbourne, Victoria, Australia, 1992.

James, M. et al, *Pile Load Test Results Using the New Statnamic Method,* Berminghammer Corporation, McMaster University.

Lambe, T. W., *The Structure of Compacted Clay,* Soil Mechanics and Foundations Division, May 1958.

*Standard Specifications for the Construction of Drilled Piers,* ACI Committee 336, ACI 336.1-89.

*Standards and Specifications for the Foundation Drilling Industry,* ADSC, Revised 1991, Incorporating ACI 331.1-79.

*Standard Specification for the Construction of Drilled Piers,* ACI Committee 336, American Concrete Institute, Detroit, Mich.

*Slurry Specifications for Drilled Shafts,* Caltrans Specialists.

Pells, P. J. N. et al, *Bentonite Piles in Durban,* Soil Mechanics and Foundation Engineering, Proceedings of the Sixth Regional Conference for Africa, Durban, 1975.

*Grouts and Drilling Muds in Engineering Practice,* British National Society of the International Society of Soil Mechanics and Foundation Engineering at the Institution of Civil Engineers held in May 1963.

O'Neill, M. W., *Effects of Mineral and Polymer Slurries on Drilled Shafts,* Paper Presented to the Deep Foundation Institute, Chicago, Ill., Oct. 8, 1991.

Timmerhaus, P. et al, *Plant Design and Economics for Chemical Engineers,* University of Colorado.

Williams, Jr., M., *Radical Filtration of Drilling Muds,* Galveston Meeting, Oct. 1939.

Reese, L. C. et al, *Bentonitic Slurry in Constructing Drilled Piers,* University of Texas.

Holden, J. C., *The Construction of Bored Piles in Weathered Sedimentary Rock,* Road Construction Authority of Va., May 1984.

Holden, J. C., *Construction of Bored Piles in Weathered Rocks,* Part Four: Bentonite Construction Procedures, Technical Report 69, Road Construction Authority of Va., 1984.

Cernak, B., *The Time Effect Suspension on the Behavior of Piers,* Institute of Civil Engineering, Bratislava, CSSR.

Day, P. W. et al, *Skin Friction of Underslurry Piles. Field Filter Cake Experiments.*

O'Neill, M. et al, *Effects of Mineral and Polymer Slurries on Side Load Transfer in Drilled Shafts,* University of Houston, Jan. 1992.

Tucker K. et al, *The Effect of Bentonitic Slurry on Drilled Shafts,* Research Report 351-IF, Project 3-5-83-351, Center for Transportation Research, University of Texas at Austin, Jul. 1984.

Wong, R. C. K. et al, *Design and Performance Evaluation of Vertical Shafts: Rational Shaft Design Method and Verification of Design Method,* University of Alberta, Canada, Jan. 20, 1988.

Leyendecker, E. A., *Drilling Fluids as Used with Drilled Shaft Construction,* Dresser Industries, Presented at the State Department of Highways and Public Transportation, Austin, Tex., 1984.

James, M., *Statnamic Load Test Results,* Comparitive Pile Foundation Load Test Program, Texas A&M University, 1991.

*Report of Geotechnical Engineering Evaluation Load Test Program for Drilled Shaft Foundations,* Ellis and Associates, Jan. 7, 1985.

*Filtration Equations.*

*Load Test Data BP London.*

Sliwinski, Z. J. et al, *Conditions for Effective and Bearing of Bored Cast-In-Situ Piles,* ICE, London, 1979.

Hager, R., *Cast-In-Drilled-Hole-Piles in Adverse Soil Conditions,* State of California, Business and Transportation Agency, Department of Public Works, and Division of Highways Bridge Department.

*Influence of the Boring Methods on the Behavior of Cast-In-Place Bored Piles.*

Rowe, P. W. et al, *Energy Components During the Triaxial Cell and Direct Shear Tests.*

Gale, R. S., *Filtration Theory with Special References to Sewage Sludges,* 1967.

Liao, A., *Evaluation of Polymer-Bentonite Soil Admixtures as Hydraulic Barriers for Oilfield Waste Pits and Non-Oilfield Applications,* NL Baroid/NL Industries, Inc., 1988.

Crapps, D., *Design, Construction, and Inspection of Drilled Shafts in Limerock and Limestone,* Prepared for 35th Annual Geotechnical Conference, University of Kansas, Mar. 7, 1986.

Majano E. et al, *Effect of Mineral and Polymer Slurries on Perimeter Load Transfer in Drill Shafts,* A Report to ADSC, University of Houston, Jan. 1993.

(List continued on next page.)

OTHER PUBLICATIONS

Guild, G. J., *Operating PHPA/NaCl Systems*, Amoco Production Company, Jan. 1990.

*Polymer Muds Find UK Unimpressed*, Ground Engineering, Nov. 1989.

*Polymer Soil Conditioners*, SNF Floerger, 1990.

*Hyperfloc Polyacrylamides, Technical Information Bulletin*, Hychem Inc. 1989.

Bruce, D. A. et al, *Structural Underpinning by Pinpiles*.

Hagimoto, H. et al, *D.K. Shield Method*, Daho Construction Co. Ltd., Tokyo, Japan, 1990.

*Komatsu Product Literature*, Tokyo, Japan.

Eide, O. et al, *Special Application of Cast-in-Place Walls for Tunnels in Soft Clay in Oslo*, Norwegian Geotechnical Institute, Bonde & Co., Oslo, 1972.

Chesser, B. G., *Design Considerations for an Inhibitive & Stable Water-Based Mud System*, Milpark, Houston, Tex., AIDC/SPE Conference 1986, IADC/SPE 14757.

Plank, J. P., *Visualization of Fluid-Loss Polymers in Drilling Mud Filter Cakes*, SKW Trostberg AG & F. A. Gossen, SKW Chemicals Inc., Society of Petroleum Engineers Conference 1989; SPE 19534.

Fleming, C. N., *Moderate pH, Potassium, Polymer--Treated Mud Reduces Washout*, Chevron USA, Inc., IADC/SPE Conference 1986; IADC/SPE 14758.

Bol, G. M., The Effect of Various Polymers & *Salts on Borehole & Cutting Stability in Water-Based Shale Drilling Fluids*. Koninklijke/Shell E&P Laboratorium, IADC/SPE Conference 1986; IADC/SPE 14802.

Kadaster, A. G. et al, *Field Application of PHPA Muds*, Amoco Production Co., Amoco Norway, Society of Petroleum Engineers Conference 1989, SPE 119531.

Gray, G. R., *Composition and Properties of Oil Well Drilling Fluids*, Fourth Edition, pp. 560-563, 1980.

| Mix Time = 10 minutes Hamilton Beach Mixer, Speed-Controlled at Low Shear (approx. 2500 rpm) | 40% Anionic Dry PHPA, MW 25 million | 30% Anionic Liquid Emulsion PHPA, MW 15 million | 30% Anionic Dry PHPA, MW 25 million |
|---|---|---|---|
| Dosage, active polymer, grams/liter | 1.0 | 1.0 | 1.0 |
| Dosage, as received, grams/liter | 1.0 | 3.13 | 1.0 |
| Marsh Funnel Viscosity, sec/qt | 61 | 49 | 54 |
| Novel Dry Granular PHPA vs. Conventional Emulsion PHPA and Dry Granular 30% Anionic PHPA  Higher aninioc charge and optimized surface treatment yield greater viscosity than 30% anionic polymers. | | | |

"Active polymer" dosage ignores small percentage of moisture present in dry-form polymers, and is thus approximate.

Figure 2

| Permeability = 20 darcies<br>Hydration Time = 30 minutes<br>differential pressure = 5 psi | 40% Anionic Dry PHPA, MW 25 million, Grain Size 1.5 mm | 30% Anionic liquid Emulsion PHPA, MW 15 million |
|---|---|---|
| Dosage, active polymer, grams/liter | 1.0 | 1.0 |
| Dosage, as received, grams/liter | 1.0 | 3.13 |
| Time (minutes) vs. Filtrate Vol. (mL) | | |
| 00:30 | 10 | 13 |
| 01:00 | 15 | 24 |
| 02:00 | 25 | 48 |
| 05:00 | 45 | 121 |
| 10:00 | 68 | 247 |
| 15:00 | 80 | 384 |
| 20:00 | 93 | 450 |
| 30:00 | 115 | 675 |
| Grain size is max. particle dimesion. Product contains smaller particles also. | | |

Figure 4

EARTH SUPPORT FLUID COMPOSITION AND METHOD FOR ITS USE

The present application is a continuation-in-part of commonly-assigned application Ser. No. 07/914,441, filed Jul. 15, 1992, now abandoned.

BACKGROUND OF THE INVENTION

1. Field of The Invention

This invention relates to fluids for use in boring and trenching operations in the foundation drilling industry, the subterranean construction industry, and in well drilling. More specifically, this invention relates to earth support fluids, their composition, and techniques for preparing, using, and maintaining them.

2. Description of the Prior Art

In creating foundations and shorings for buildings, bridges and other structures and in excavating and subterranean boring for installation of utilities, barrier walls, transit ways and drainage systems, fluids have been used to support the surrounding earth during construction operations. Whenever subterranean construction must be accomplished in granular, unstable, water-saturated or gas-charged soils, it has been customary to fill the boreholes, tunnel faces or excavations temporarily during construction with water-based earth-support fluids, also known as slurries or muds. These slurries have consisted essentially of water, a thickening agent and earth solids from the excavation.

The conventional materials for making these slurries are clays such as bentonite and attapulgite. More recently, water-soluble polymers have been introduced and used in place of or in combination with such clays. The most widely used type of water-soluble polymer in these applications is a partially-hydrolyzed polyacrylamide (PHPA), in the form of a primarily linear, or non-crosslinked, long chain polymer with an anionic charge density of twenty to thirty mole weight. This chemistry is available in both liquid water-in-oil emulsion form and in dry form. Other polymers include dry forms of guar gum, xanthan gum, cellulosic polymers, and blends of these. All of these polymers, including the PHPAs, have been optimized to be completely water soluble and/or homogenizable.

These polymers are designed to mix without forming masses or pearls of undissolved or semi-hydrated polymer. It has been customary to prehydrate and maximize solubilization and homogenization of these materials before introduction of the fluid into the excavation or borehole. This has been accomplished through the use of induction systems, recirculation, agitation, and processing of the polymer, and retaining the prepared fluid in a maturation tank for a period of time to maximize solubilization and homogenization of the constituents of the fluid, prior to introduction of the fluid into the excavation or borehole.

Clay slurries or muds are formulated with about five to ten percent bentonite in fresh water or about five to ten percent attapulgite in salty water. When traditional polymers are used, the dosage is generally much lower and ranges from about 0.01 to about 3.0 percent for most applications. Whether the slurries are formulated with clays or polymers, the object is to create a viscous fluid that stabilizes and supports the walls of the excavation, excludes groundwater and gases from the excavation, and facilitates the progress of the construction project. A key to success in these efforts is to avoid loss or seepage of the excavating fluid into the surrounding earth during the excavating operation. If the fluid is lost into the earth (e.g. into a sandy formation) and the excavation cannot be kept full of fluid, the excavation can collapse and groundwater or gases can enter the excavation. Excessive fluid loss can also disrupt naturally occurring cohesive forces between the formation solids. Disruption of this natural cohesion destabilizes the formation.

In the prior art the viscosity of the earth support slurries has been maintained by design generally in a range of about 30 to about 45 seconds per quart as measured with a Marsh Funnel according to viscosity measurement procedures standardized by the American Petroleum Institute. This range of viscosities was felt, in light of "industry knowledge" of the prior art, to be the most effective and least damaging.

The cohesion of granular earth solids is governed by the earth binding coefficient of the slurry. The earth binding coefficient is the composition's affinity for earth solids, which causes the earth support fluid to chemically and physically bond or attach to excavated earth, both on the excavation tool and on the excavation walls. This property preserves or improves the tendency of grains of earth to hold together in mass as opposed to separating into individual grains or smaller masses. This property also improves the low-shear adhesion of masses of granular earth solids to excavating tools, which aids in conveying of the earth solids up from the excavation. The earth binding capacity is also manifested as the ability of the earth support fluid to film or encapsulate clay bearing mineral solids and thereby reduce their tendency to adsorb, absorb or take up water.

When clays or dry-form conventional polymers are used to prepare the slurries, specialized equipment and procedures have been necessary to mix the clay or polymer (powder or granules) into the water, stir and homogenize the mixture, transfer the slurry between the boreholes or excavations and the mixing equipment, and process the slurry to remove sand and excavated solids. This equipment normally includes large mixing and holding tanks, agitators, pumps, hoses or pipes, cyclonic desanders and vibrating screen machines. Such equipment is large, relatively complex and costly.

With some polymers, it has been possible to simplify the mixing and handling equipment to reduce the investment required and to simplify the handling of the slurries. Depending on slurry composition and properties, it is sometimes possible to operate without desanding equipment and related tankage. For example, this might be possible when nonthixotropic polymer slurries are in use. However, all dry-form polymers in the prior art have required some type of specialized equipment for successful prehydration and mixing of the polymer into a homogeneous and fully-dissolved form. The practice of using such mixing or prewetting equipment is referred to herein as "indirect addition."

When the conventional liquid emulsion PHPA (mentioned above) is used as the primary slurry additive, it has occasionally been added directly into the borehole or excavation, and the drilling or excavating tools have been used to mix it with water and/or fluid in the borehole. However, this is not the industry-preferred method for emulsion PHPA addition. Typically an eduction unit and hydration tank with recirculating pumps are utilized to insure complete solubilization of the polymer prior to introduction to the excavation, or borehole.

Direct addition mixing has been claimed to be possible for the liquid form of PHPAs, which has historically been considered superior for mixability with, and solubility in, water when compared to dry polymers, in a number of industries. Emulsion polymers have been promoted as possessing less tendency toward agglomeration and wastage of polymer than can occur when attempting to mix dry-form polymers with less-than-adequate equipment. Insufficient shear is generally applied to accomplish complete inversion of the emulsion PHPA and dispersion of the polymer in direct-addition applications. This has in actuality caused considerable wastage of added polymer due to incomplete inversion or inactivation of the polymer in the prior art.

The various industries have not widely recognized or addressed the problems of incomplete inversion and inactivation of liquid emulsion PHPA. Some manufacturers and consumers have documented hydration and solubilization problems occurring due to the hydrophobic surfactants and the mineral oil contained in the emulsion polymers. Problems such as delays in polymer inversion due to inadequate inversion systems in the emulsions, and inadequate mixing shear to fully break the emulsion micelle and develop the polymer chains from an emulsion package have also been noted. It has also been noted that the surfactant and oil contained in the emulsion did not completely disassociate from the emulsion-based PHPA. This reduces performance efficacy through the coating and/or blinding of active polymer sites. Some industries have recommended the use of a high shear pump, such as the Echols pump, or centrifugal pump, for premixing of both emulsion and dry form PHPAs to insure complete homogenization and solubilization. One publication specifically addressing these problems is "Field Application of PHPA Muds" by A. G. Kadaster & G. J. Guild, Amoco Production Co.; G. L. Hanni, Amoco Norway Oil Co.; and D. D. Schmidt, Amoco Production Co., SPE presentation, 1989, San Antonio, Tex.

The ability to rapidly mix and yield polymer directly in the borehole or excavation is advantageous because it eliminates the need for costly, cumbersome mixing and processing equipment. It can significantly reduce time required to drill, excavate and construct piers, walls, pads, wells, etc.

Whenever polymer has been used, a primary objective in mixing polymer into water or earth excavation fluid has been to create a homogeneous solution or mixture and to accomplish complete dispersion and dissolution of the polymer as readily as possible. Completely dissolving and homogenizing the polymer in the water or fluid has been considered a key to optimum performance. Incompletely homogenized polymer of any kind, whether in the form of agglomerates, polymer strings, "fisheyes," gels, microgels, pearls or masses has been seen as disadvantageous and wasteful. Avoiding the presence of incompletely hydrated polymer in the slurry has been a prime objective of fluid design and mixing practice.

Although bentonite is the principal material used for preparing slurries, bentonite slurries have become increasingly regulated as pollutants, and as a result, disposal costs have risen. Bentonite slurries must now generally be removed from a construction or drilling site and disposed of in a designated landfill or in accordance with local authorities and permits. This additional cost, along with the high capital cost and complexity of bentonite slurry mixing and processing equipment has prompted increased use in subterranean construction and drilling industries of polymer, especially the liquid emulsion PHPA.

According to current "industry knowledge", emulsion PHPA requires less equipment to process and is seen as less polluting. However, emulsion PHPA contains refined hydrocarbon oils and surfactants, and thus creates environmental pollution problems of a different kind. This oil and surfactant-pollution problem has only recently been acknowledged or widely considered. The EPA and other regulatory agencies are beginning to recognize the significant toxicity of these hydrocarbons in oil and gas drilling. In addition to liberating a hydrocarbon into the environment, PHPA emulsion is beginning to be recognized as a potential fire hazard on-site. Special fencing and precautions are now required on sites where emulsion polymer is being stored.

There has been little understanding of, or remedy offered for a problem frequently encountered in boring, drilling, and trenching (in non-mineral based slurries)—the problem of earth support fluid loss into permeable soil formations. This seepage or "fluid loss" is common in granular, permeable soils, such as sand and gravel, and in fractured and fissured formations. Fluid loss can seriously interfere with the processes of excavation, drilling, or construction. Excessive fluid loss is a primary cause of destabilization of the excavation, pollution of groundwater, delays in excavation and boring projects, increased concerns for safety, and increased consumption of slurry, slurry additives, concrete, cement, grout, etc.

Extreme cases of fluid loss have been attacked by dumping bentonite, silts, and/or other available colloids into the excavation or by boring native silts and clays in an attempt to form a mineral-enhanced filter cake at the formation interface of the excavation. When a mineral-based or mineral supplemented slurry is used in fine-grain sands, the dispersed mineral colloids in the slurry can provide improved control of fluid loss because the pores in the soil are small. But mineral-based and mineral supplemented slurries, due to the thick filter cakes they create, reduce borehole gauge. This reduced gauge can reduce the diameter of formed structures or casings created in the excavations and boreholes. Similarly, mineral-based and mineral supplemented filter cakes can negatively affect the geometry of the formed structures or casing. Additionally, mineral-based or mineral supplemented filter cakes, as a sheath of continually reactive and hydratable colloids at the interface between the concrete and surrounding earth, can reduce skin friction on which formed or poured structures rely for their load-bearing capacities. Reduced friction may promote instability, movement and stress on these structures, which can damage the subterranean structure and the super-structure that rests on them.

With polymer-based slurries containing no bentonite or other cake-building inorganic colloids, fluid loss control has been unattainable or poorly realized. The dissolved water-soluble polymers cannot plug the pores in the granular soil or create a filter cake as can bentonite and inorganic colloids. It has been impossible to control fluid loss without adding mineral colloids, similar colloids or finely-divided materials such as native clays and silts incorporated into the slurry from the excavation.

BRIEF DESCRIPTION OF THE DRAWING

FIG. 2 is a chart showing a comparison of viscosity development efficiency using a composition and method of this invention.

FIG. 3 also shows the effects of hydration time on fluid loss control of a composition and method of this invention and on a prior art polymer composition and method, both compared to bentonite. FIG. 3 illustrates the fluid loss control of construction drilling slurry products at 5 psi differential pressure against a manufactured artificial sandstone disk ¼" thick having permeability of 20 darcies and mean pore diameter of 60 microns nominal.

FIG. 4 is a chart showing filtration control performance versus time at equal hydration times (30 minutes) for a preferred embodiment of this invention and for a composition of the prior art.

FIG. 6 illustrates a comparison of mean normalized perimeter shear for 30 minutes contact time of Bentonite, Attapulgite, Emulsified Polymer, and Dry Vinyl Polymer.

SUMMARY OF THE INVENTION

Figure 1:
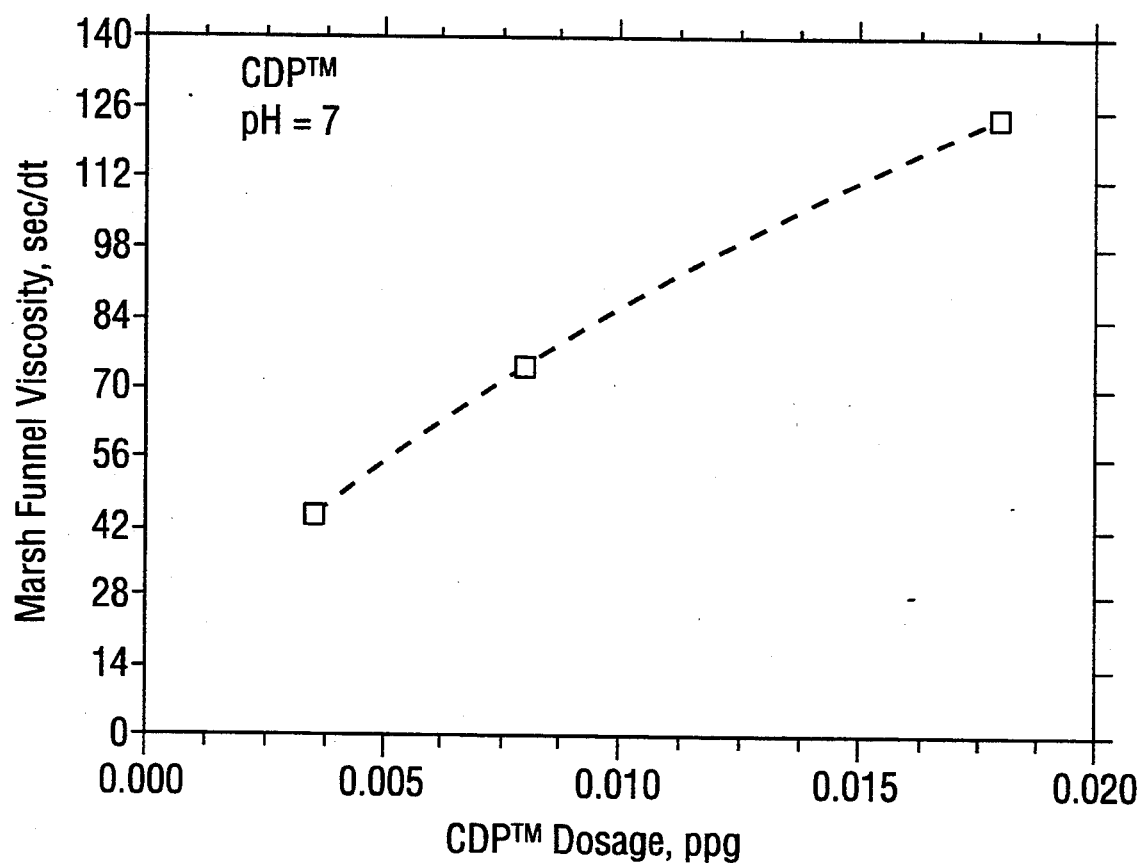
FIG. 1 is a graphic representation of the Marsh funnel viscosity versus the CDP dosage. The term "CDP" shall be understood to refer to the trade name for a polymer based product within the scope of this invention marketed by KB Technologies Ltd.

The present invention is a water-soluble, water-swellable, hydratable and/or water-dispersible material(s) and a method for using the material(s) to prepare and maintain earth support fluids. The earth support fluids have suspended therein partially-dissolved or hydrated or dispersible synthetic, natural, or modified natural polymers; synthetic and natural resins and latexes; as well as all grafts and blends of the above materials with or without surfactants or hydration inhibitors. The earth support fluids are prepared and maintained without added commercial mineral colloids, and exhibit fluid loss control and preferably one or more of the following properties: borehole or excavation wall stabilization, earth solids encapsulation, improved cohesion of the excavated earth, and improved development of perimeter load transfer at concrete-to-earth interfaces in subterranean structures formed in excavations. It should be understood that for purposes of this application the terms "perimeter load transfer", "perimeter shear", and "skin friction" are used interchangeably.

A preferred embodiment of the present invention displays, due to the combination of molecular weight and anionic charge density of a polymer of the invention, improved earth binding characteristics expressed by improved cohesion of excavated earth solids, especially sands and gravels. This improvement is earth binding and cohesion facilitates excavation operations, especially auger drilling, and results in greater productivity.

The materials of the present invention, due to one or any combination of their properties (their ionic charge density, molecular weight, chemical composition, cross-linking, surfactant treatments, physical granulometry, particle shape, plasticity, hydration characteristics, solubility characteristics), can provide fluid loss control when used according to the methods defined in this patent. This method provides for partially-hydrated or functional, insoluble particles (hereinafter referred to as "pearls" or "masses") to be dispersed in the slurry at all times or at specific times of need during the excavation or drilling process.

The "gel masses" or "pearls" of this invention are formed upon hydration. These masses are formed in a variety of sizes and shapes, including but not limited to planar configurations (such as a potato-chip configuration); spheroidal configurations, elongated finger-like configurations, and deformable globules.

The dimensions of the hydrating or hydrated masses can range from 10 microns to about 100 mm with presently available materials, and can be larger if composed of multiple individual masses which have fused together in the process of hydrating. Still larger hydrating or hydrated masses may be possible with modifications in the preparation of the dry compositions to produce larger dry particles which are the precursors of the hydrated masses. The smallest hydrated masses are produced by dissociation of larger hydrated masses or by direct hydration of finely-divided dry composition particles.

The masses, when present in the fluid, can be partially or fully hydrated. The masses are preferably deformable. This deformability helps the masses conform to, lodge in and constrict or plug pore spaces in granular permeable formations. This mechanism controls fluid loss.

The masses can have a finite life span in the fluid, corresponding to the time required for the masses to completely hydrate and dissolve in the case of compositions which are completely water-soluble. For compositions which are hydratable or water-swellable, the masses may go through phases of hydration followed by dissociation. During the hydrational phase the masses generally become larger; then at some point they can begin to dissociate and may produce many smaller hydrated particles or hydrocolloids in the fluid.

The hydrated or partially-hydrated natural and synthetic polymers which form masses that plug the pores in granular soils, and thereby slow the seepage of the earth support slurry into the surrounding soil, are preferred. Polymers which exhibit earth binding capacity are preferred. Polymers which allows high formation-to-concrete adhesion, which is expressed as "perimeter load transfer coefficient", are also preferred.

The ability of the polymeric and resinous materials to form both transient or degradable pearls or masses or form more persistent pearls or masses for controlling fluid loss, or for optimally plugging porosity in permeable formations is achieved in the manufacturing or processing of the material or during preparation of the fluid in the field by one or more of the following techniques:

(a) partially crosslinking the material to retard hydration, reduce solubility, and increase branching; (b) highly crosslinking the material to retard hydration and reduce solubility; (c) surface treatment (including in-situ co-addition) of the materials, as with a surfactant, a coating, microencapsulation, or physical processing, to retard hydration; (d) blending the materials with co-additives (e.g. electrolytes, divalent cations, etc.) which retard hydration; (e) granulation or flaking or agglomeration and sorting to optimize particle size of the dry materials, which impacts rate of hydration for hydratable materials and the size of semi-hydrated particles in the slurry; granulation and size sorting also impact pore-plugging performance of insoluble or plastic particulates; (f) copolymerizable surfactants being incorporated in the polymers backbone which impact hydrophilic tendencies; (g) polymerization to yield an ampho-teric or ampholytic structure; (h) grafting materials together to form an optimized end material; and (i) the incorporation of a hydrophobic or semi-hydrophobic, or non-water soluble material to retard water solubilization.

Within the scope of this invention are synthetic, natural and modified natural polymers, including blends and grafts, which are prepared and used in ways which create a fluid comprising a continuous liquid phase in which is present a plurality of hydrating or hydrated polymer masses. Examples of such materials are synthetic polymers, polysaccharides, gums, biopolymers and combinations thereof. In a preferred embodiment of this invention an anionic, polyacrylamide copolymer forms both the continuous fluid phase and the discontinuous phase of hydrating or hydrated masses dispersed in the fluid. In an alternate embodiment, hydrating or hydrated masses of natural polymers or modified polysaccharides are suspended in a continuous fluid phase of solubilized anionic polyacrylamide copolymer.

The polymers of the present invention are preferably added in a solid granular, flaked, or agglomerated state with the dry particles ranging in size from 0.01 mm to 50 mm (in certain flaked products), and currently in a range of 0.01 mm to 10.0 mm, and with the majority by weight of the particles being between 0.10 mm and 2.5 mm for most available products. All of these materials become larger when initial hydration occurs, although dissociation may eventually reduce the hydrated particle size.

The polymers of the present invention form viscuous fluids with Marsh Funnel viscosities ranging from about 35 to about 300 seconds per quart, and more preferably within the range of about 40 to about 120 seconds per quart. Increased viscosity is a key feature of the present invention. Viscosity, polymer selection and polymer dosage are specified in relation to reactivity, hydrational potential, granularity and porosity of the earth formation. The resultant slurries should allow settling of disturbed earth solids larger than about 70 microns as well as dispersion of additional fresh polymer.

DETAILED DESCRIPTION OF THE PREFERRED EMBODIMENT

The present invention comprises a method of formulating and using an earth support fluid containing polymers which controls fluid loss, stabilizes the formation being excavated, improves loading and removal of earth by excavating tools, and allows development of high concrete-to-formation friction coefficients. The methods may be used in subterranean construction operations, excavations, and well drilling wherein an earth support fluid or drilling fluid is used in a vertical, angled, or horizontal borehole, tunnel, trench, or other excavation.

The proportion of material in this fluid composition can range from 0.1 to 100 kilograms per cubic meter by dry weight of material on volume of water or slurry. The Marsh Funnel viscosity of the fluid is preferably maintained between 35 seconds and 300 seconds per quart; more preferably between 45 and 120 seconds per quart; and most preferably between 55 and 100 seconds per quart. FIG. 1 is a chart showing the Marsh funnel viscosity versus polymer dosage for one embodiment of this invention.

The method comprises formulating as the earth support fluid an aqueous slurry having suspended therein water-soluble, water-swellable, hydratable and/or water-dispersible compositions. The earth support fluids contain suspended therein partially-dissolved and/or hydrated and/or dispersible synthetic or natural polymers, resins and/or latexes; and all grafts of the above compositions. The molecular weight of the composition(s) may vary over a wide range, e.g., 10,000–40,000,000 or higher. The invention, however, finds its greatest usefulness when acrylamide copolymers having molecular weights of 100,000 or more, preferably one million or more, and most preferably in excess of 10,000,000 are applied. The anionicity of the copolymer may be obtained from the hydrolysis of acrylamide during the polymerization or from the copolymeration of acrylamide with the anionic monomers comprising acrylic acid, methacrylic acid, maleic acid, maleic anhydride, fumaric acid, itaconic acid, vinyl or, styrene sulfonic acid, 2-acrylamido-2-methylpropane sulfonic acid (AMPS) and the like, and water soluble salts thereof. The preferred anionic monomers are acrylic acid, methacrylic acid, maleic acid, vinyl or styrene sulfonates and AMPS or their salts. Copolymers comprising acrylamide and/or other non-ionic monomer, with more than one anionic monomer foregoing is also within the scope of the invention.

The molar percentage of the comonomers in the polymer may vary within certain limits, provided that the total adds up to 100%. The anionic charge density will vary from about 5% to 90%, preferably 10% to 80%, and most preferably 35% to 65% in the polymer. The composition, anionicity, and molecular weight of the copolymer may be optimized for the particular earth formation and water conditions in order to achieve the desired drilling, boring, or excavation and earth supporting functions.

The anionic copolymer of the invention may be further modified by incorporating certain cationic monomers in the polymer forming ampholytic polymers. The cationic monomers are selected from the group consisting of: diallyldimethylammonium chloride, quaternized dimethylaminoethyl (meth)acrylates and N,N-dimethylaminopropyl (methacrylamides) and combinations thereof. The quaternizing agent may be methyl chloride or dimethyl sulfate.

Non-ionic monomers for use in the practice of the present invention are selected from the group consisting: acrylamide, methacrylamide, N-vinyl pyrrolidone, vinyl acetate, stryrene, N-vinyl formamide, N-vinyl acetamide or mixtures of the forgoing. Especially preferred is acrylamide.

A small amount of water insoluble/hydrophobic monomers such as $C_5$ to $C_{20}$ long chain alkylates, hydroxyalkylates, and N-alkyl substituted acrylamides may also be incorporated in the copolymer of the invention. These hydrophobic groups tend to associate with one another in an aqueous solution to form an inter/intra molecular association. As a result, the solution viscosity is increased and the viscosity is relatively insensitive to salts as compared to polymers without the hydrophobic groups.

Polymerization of the monomers may be conducted in the presence of a crosslinking agent to form the crosslinked or branched composition. The crosslinking agent comprises molecules having either a double bond and a reactive group, two reactive groups or two double bonds. The agent may be selected from a group comprising N,N-methylenebisacrylamide, N,N-methylenebismethacrylamide, polyethyleneglycol di(-meth)acrylate, glycidyl acrylate, acrolein, methyoacrylamide, aldehydes, glyoxal, diallylamine, triallylammonium salts, ammonia, $C_1$ to $C_{25}$ amines (including diamine or triamine), epichorohydrine, diepoxy compounds or the like and mixtures of the foregoing. The crosslinking or branching is due to the inter or intra molecular reactions of the monomeric units in the polymer chain with the crosslinking agent. The agent is to be used in sufficient quantities to assure a crosslinked or branched composition so long as the resulting polymer is still water soluble or hydratable. Preferably, 0.001% to 20%, and more preferably 0.01% to 10% based on the total monomer weight, is used for the purpose. The proportion of these materials in this application can range from 0.01 to 300 kilograms per cubic meter by dry weight of polymer on volume of water or slurry.

The rheological profile of the polymer fluid is significantly impacted by the anionicity and the degree and type of crosslinking. FIG. 2 is a chart showing a comparison of viscosity development efficiency using a composition and method of this invention.

The composition pearls or masses can exhibit a finite and controllable life span in the excavation fluid. This life span can range from several minutes to several weeks based on the composition chemistry, physical and chemical properties of the excavation fluid. The composition masses' life span can be controlled by any one or a combination of the following chemical mechanisms: (1) degree of crosslinking and/or branching; (2) method of crosslinking and/or branching; (3) solubility, and/or hydrophilic/hydrophobic nature of the compositions; and (4) inclusion of coadditives and/or surface treatments to the compositions.

The composition masses' life span may be influenced in-situ either positively or negatively by continued exposure to shear stress, exposure to cations or electrolytes, exposure to earth solids, or continued hydration over time. A composition pearl or mass can be defined as a discrete constituent, or element, existing independently within an excavation fluid, and possessing the characteristics given above in the Summary of Invention. These pearls or masses impart unique performance characteristics to the fluid allowing for the reduction of fluid loss to the excavated formation. The composition pearls' or masses' ability to decrease formation porosity at the formation interface is achieved through the pearls or masses being drawn into the formation voids and completely or partially plugging and sealing these voids.

As these composition pearls or masses build on one another they constrict or plug pore throats to reduce fluid loss. A filter cake or matrix seal of synthetic or natural polymer and/or resin is formed. This filter cake or seal may incorporate water soluble polymer or resin to further improve filtration control and filter cake construction. The optimization of these pearls or masses is essential to the unique properties of the fluid and the filter cake. These composition pearls or masses of synthetic or natural polymer or resin or combinations thereof allow for the elimination of bentonite, silt, and/or other colloidal material from the fluid design when used in one method of this invention.

The interaction between the pearls or masses, the polymer, and the earth forms a filter cake on the fluid column walls. The polymer filter cake significantly assists in maintaining a stable side wall in the formation. Side wall stabilization is enhanced by reduction in fluid loss to the formation, maintenance of hydrostatic pressure differential transferred through the wall cake and in-depth matrix seal, and increased earth binding capacity of the fluid.

The polymer filter cake produced by this invention significantly reduces the fluid loss to the surrounding formation. Fluid loss to the formation hydrates the formation and disrupts the natural cohesive forces between formation solids. This loss of cohesive forces causes side wall sloughing and cave-ins. The polymer filter cake maintains a significantly more stable excavation than that known in the prior art by reducing the hydration of the formation and maintaining a hydrostatic pressure differential through the cake.

Figure 3:
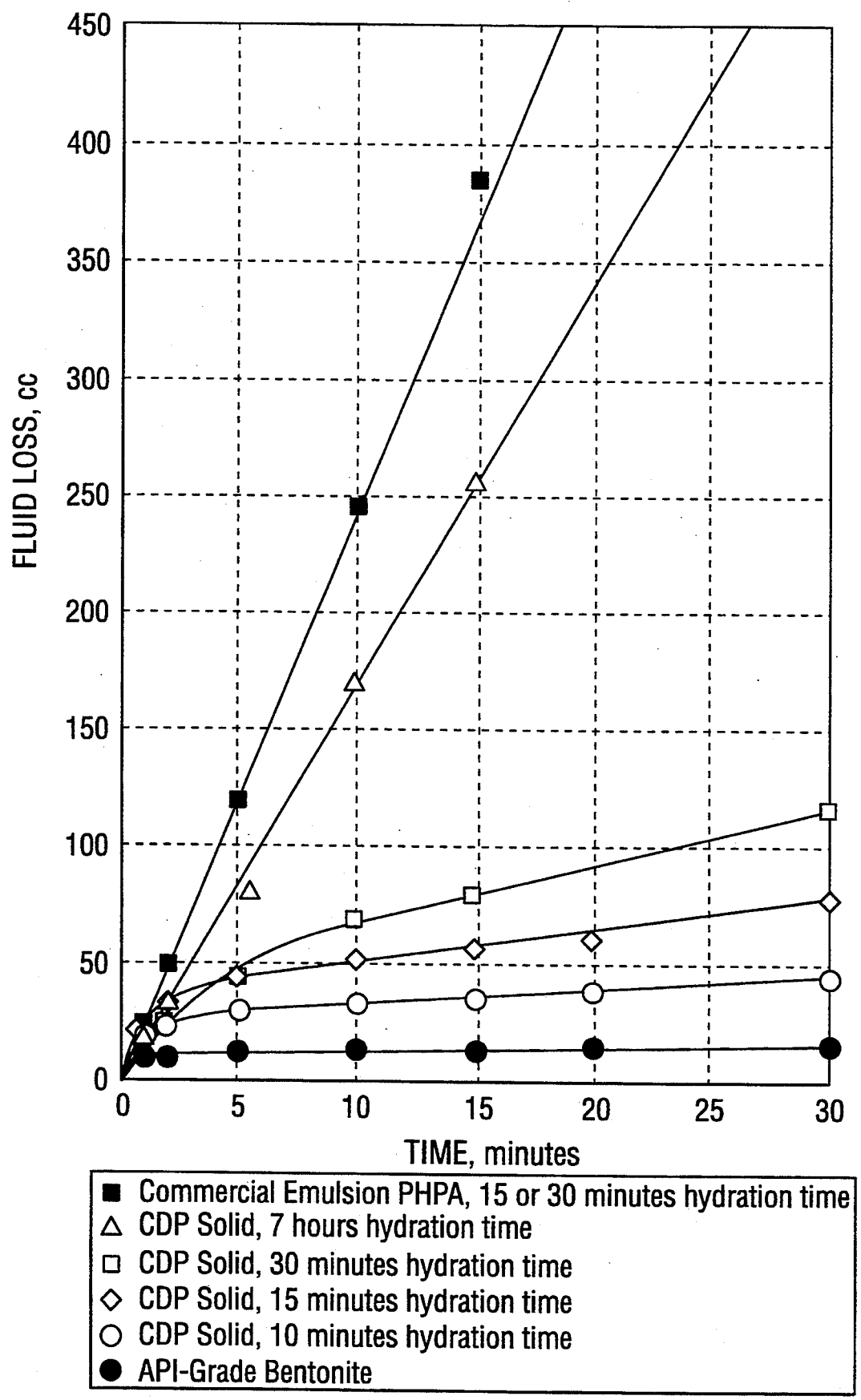
FIG. 3 is a graphic representation of the fluid loss control characteristics of the composition and method of this invention in comparison to prior art compositions and methods.

FIG. 3 shows the fluid loss control versus hydration time of the preferred embodiment of this invention and two other commercially available construction drilling slurry products. Hydration times shown in FIG. 3 are time elapsed between introduction of polymer into mix water and initiation of filtration test. Commercially available products were mixed at low-shear with a single corrugated disk impeller at approximately 3,000 RPM. The products were stirred for 5 to 10 minutes and were unstirred during the remainder of the hydration time. Bentonite was mixed at a high shear to assure good dispersion. The test was conducted at a 5 psi pressure differential against a manufactured, artificial sandstone disk, $\frac{1}{4}''$ thick having a permeability of 20 darcies and a pore diameter of 60 microns nominal.

FIG. 4 is a chart comparing filtration control performance of a preferred embodiment of this invention to filtration control of a prior-art polymer fluid, when both polymers have equal times of hydration.

In a preferred embodiment of this invention, the polymer materials are introduced into the fluid by direct addition into the mouth of the borehole or excavation and the excavating or drilling tools are used to mix the fluid in-situ without benefit of other specialized mixing or pre-mixing equipment or procedure.

In an alternate preferred embodiment of this invention, the materials used to create the earth support slurry are introduced indirectly into the mouth of the borehole or excavation, without the excavating or drilling tools being exclusively used to mix the fluid in-situ. Material would be added to the system with the benefit of other specialized mixing, pre-mixing equipment, hoppers, or other indirect procedures.

The charge density characteristics of the polymers of the invention are a primary factor in the earth binding capacity of the fluid. Earth binding capacity is a polymer's or material's ability and capacity to bond to and stabilize exposed or excavated earth. This affinity functions to improve side wall stabilization, borehole gauge and removal of excavated earth. Anionic charge density, or the ratio of anionically charged pendant units on the polymer, is a primary contributor to the degree of earth binding capacity a polymer possesses.

In one preferred embodiment of this invention, the excavation carrying capacity, or the ability of the excavation tools or systems to hold and remove increased loadings of earth, is significantly improved due to the earth binding capacity of the slurry. The improved earth binding capacity allows removal of excavated solids, or earth, with excavation tools not previously successful when prior art materials have been used. Improved excavation carrying capacity increases the efficiency of the excavation operations.

In a preferred embodiment of this invention, the polymer is a water-soluble or partially water-soluble or hydratable or water-dispersible linear, branched, crosslinked, partially-crosslinked, or grafted material, which is further treated with hydrophobic surfactant to retard hydration or through blending the materials. Hydrophobic surfactants can be added by in-situ co-addition, coating, micro encapsulation, or physical processing.

When the polymer of the subject invention is non-crosslinked and water-soluble, partially water-soluble, hydratable or water-dispersible, the granulometry, hydrophilicity/hydrophobicity, molecular weight, rate of dissolution, and other factors are combined with an application technique which exploits the transitory hydrational phase (the period of time during which the polymer is suspended in the fluid as discrete partially-dissolved or dissolving masses or pearls) to accomplish control of fluid loss.

Hydrophobic surfactants can be incorporated into the polymer during manufacture and as an interstitial component dried within the polymer granule or as a post-manufacture surface treatment to retard hydration and prolong the duration of pearls or masses with and without crosslinking. The hydrophobic surfactants comprise surface active agents having HLB (hydrophilic/lipophilic balance) values in the range of about 2 to about 10, preferably less than 8. Suitable surfactants include sorbitan esters, phthalic esters, fatty acids, glycerides, glycerines esters, as well as amides and ethoxylated or propoxylated versions of the above. A preferred embodiment of this invention incorporates slightly to moderately crosslinked polymers with slight surfactant treatment.

In one preferred embodiment of this invention, the pearls or masses are transitory. The transitory nature of the pearls or masses is controlled by the type and amount of crosslinking of the polymers. The polymer crosslink ruptures over time and the pearls and masses degrade. Hydration, shear and ionization degrade the total polymer and disrupt the mass structure. The soluble polymers, pearls, and masses, collapse or degradation can be accelerated by contact with divalent and trivalent cations, oxidizers and/or chlorides. This collapse or degradation of the pearls and masses is critical for construction and other industries where concrete, grout, cement, or other materials are placed in a column, wall, or trench. In these applications side wall friction, or side wall load bearing capabilities are important. This invention provides for significantly reduced residual interference with side wall characteristics, thereby producing improved structural integrity and load bearing capacity.

Figure 5:
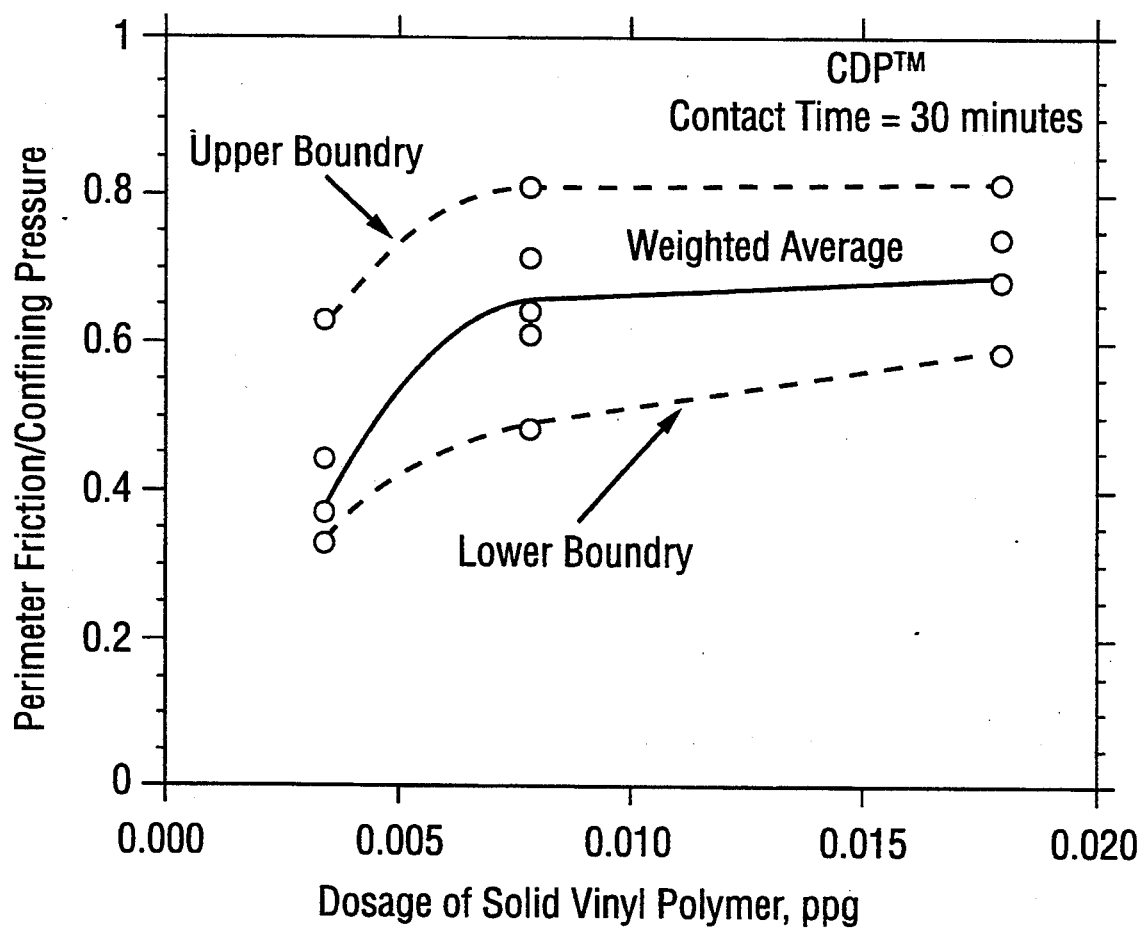
FIG. 5 is a graphic representation of peak values of perimeter friction/cell pressure from extraction testing for fine sand specimens drilled under CDP slurries with 30 minutes contact time.

The degradation of the solubilized polymer, pearls and masses within the fluid as well as at the side wall interface significantly improves the side wall friction coefficients over prior art drilling and excavation fluid technologies. FIG. 5 shows a graphical representation of perimeter friction/cell pressure from extraction testing for fine sand specimens drilled utilizing prior art technology and a preferred embodiment polymer. Slurry degradation also improves displacement by concrete, cement, grout, etc. yielding improved quality of the final structure or plug due to decreased contaminant intrusions, voids within, and/or direct contamination of the concrete, cement, grout, etc. of the final structure.

Figure 6:
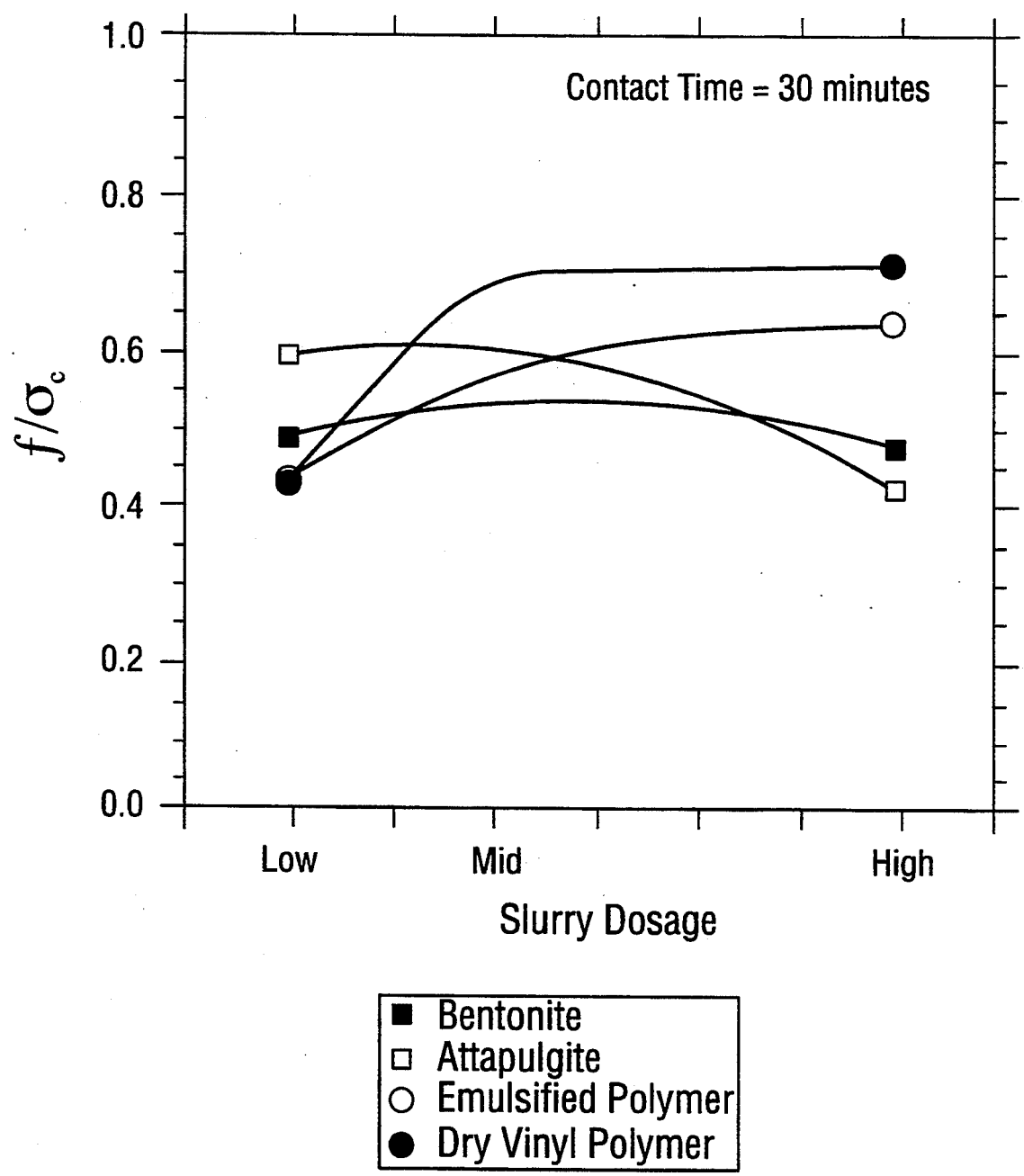
FIG. 6 is a graphic representation of a comparison of perimeter load transfer coefficients for various materials.
Figure 7:
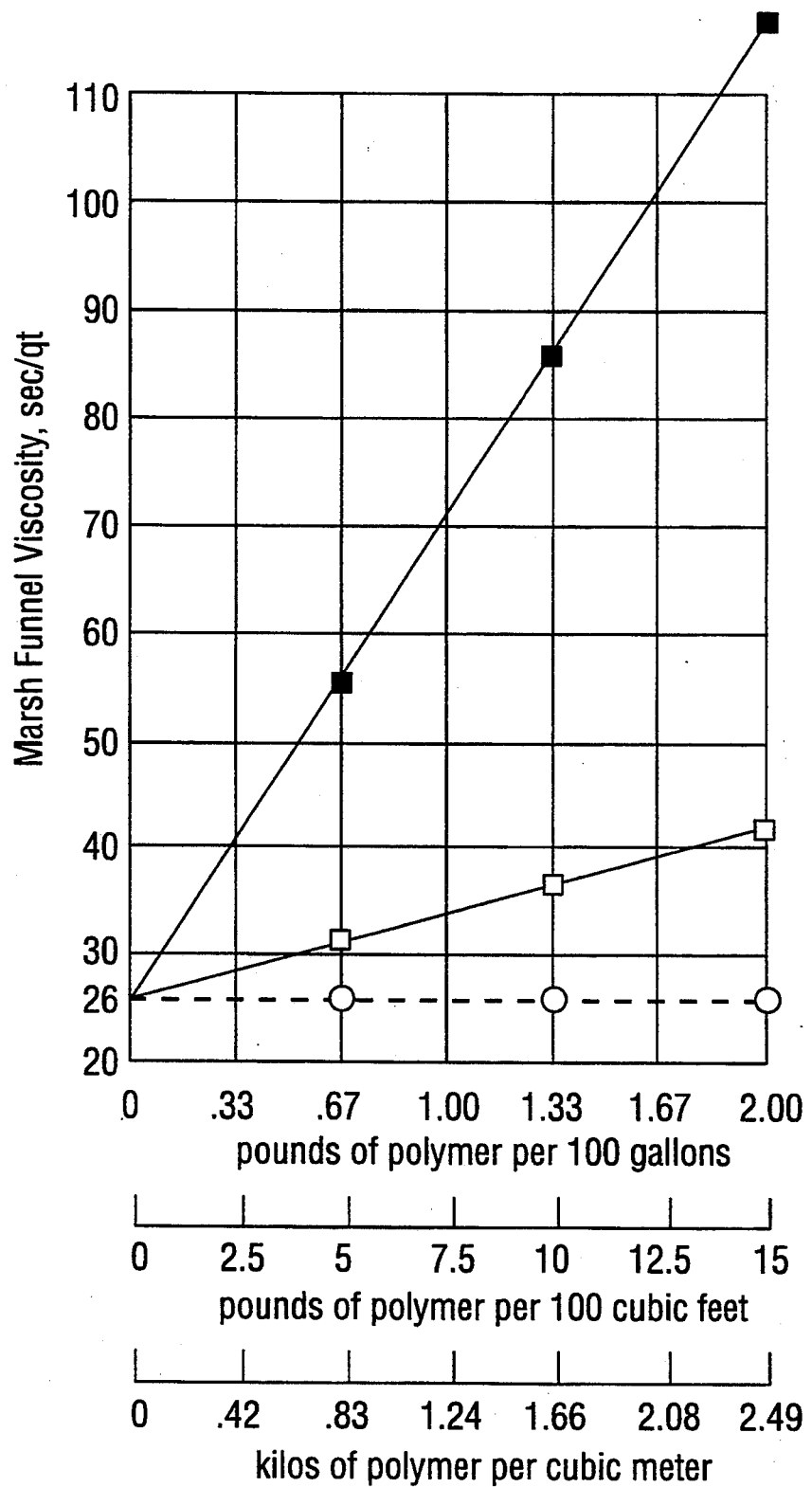
FIG. 7 is a graphic representation of viscosity development efficiency of CDP versus emulsion PHPA at high dosage ranges in fresh water with viscosity of water 26 sec/qt.

In one preferred embodiment, the hydrated or partially-hydrated natural and synthetic polymers form masses that plug the pores in granular soils, and thereby slow the seepage of the earth support slurry into the surrounding soil. Polymers which exhibit earth binding capacity are preferred. Polymers which allows high formation-to-concrete adhesion, which is expressed as "perimeter load transfer coefficient", are also preferred. See FIGS. 6 and 8.

Figure 8:
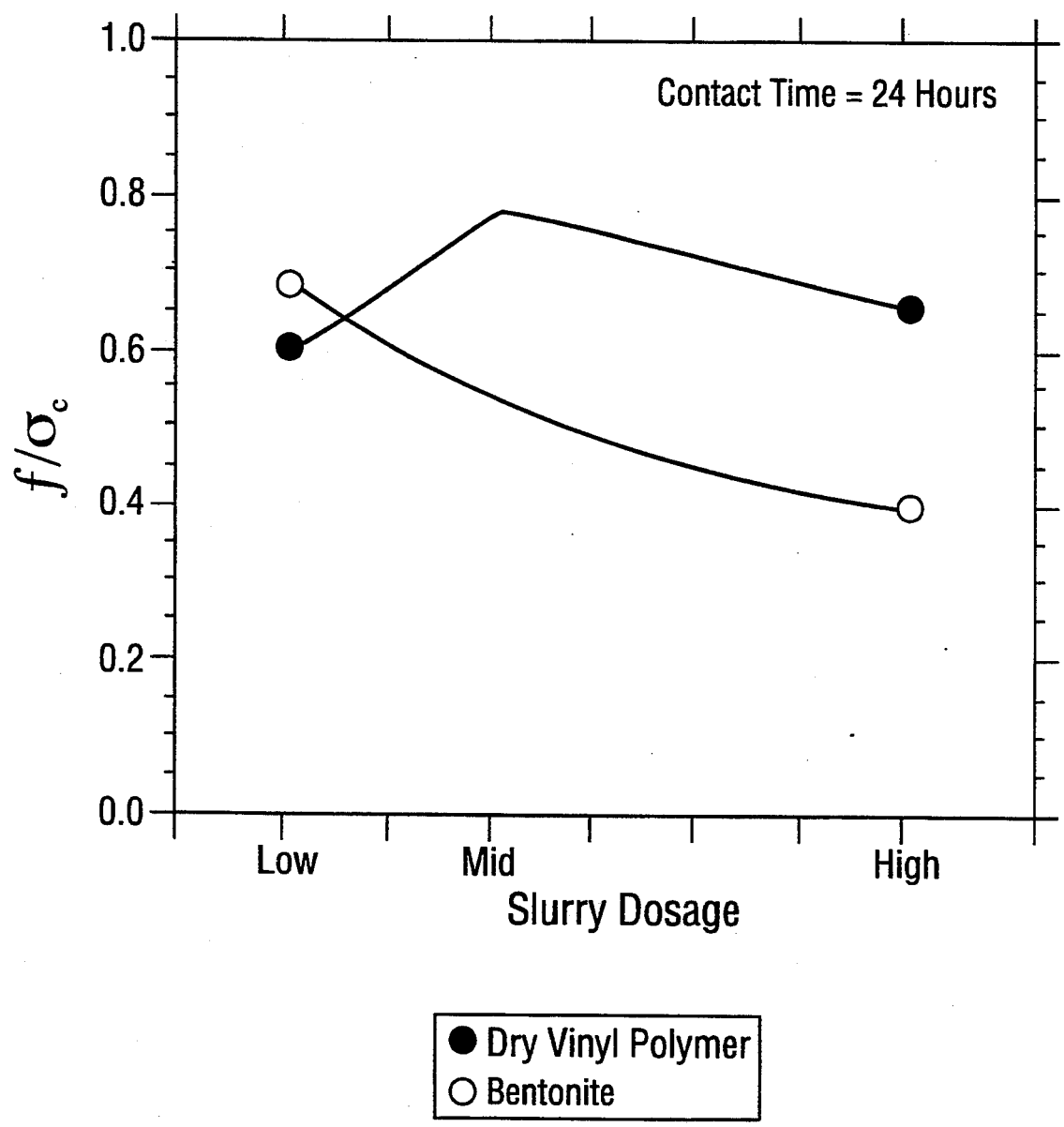
FIG. 8 is a graphic representation of a comparison of mean normalized perimeter shear of bentonite and dry vinyl polymer for 24 hours contact time.

FIG. 8 shows skin friction development of a preferred embodiment of the invention after 24 hours contact time in an experimental drilled shaft. The figure shows that the preferred embodiment outperformed bentonite in developing skin friction. The figure also shows, by omission when compared to FIG. 6, that slurries formulated from attapulgite and from emulsion PHPA failed to maintain a column of slurry in the experimental drilled shafts due to complete fluid loss. The polymer of the present invention developed the highest skin friction of the slurry formulations which were capable of maintaining fluid in the experimental drilled shaft for 24 hours.

In still another preferred embodiment of this invention, dry particles, flakes, agglomerates, or crystals of materials used to prepare a slurry are sorted or produced to consist of various size particulates or flakes, ranging in size from 0.01 mm to 50 mm, preferably 0.01 mm to 10.0 mm, and most preferably 0.10 mm to 2.5 mm as determined by screening with sieves having openings of these sizes. The dry particles, flakes, or crystals of materials used to prepare the slurry are of various sizes. The materials are produced, sorted and selected in various particle-size sub-ranges to optimize fluid loss control performance in specific types of granular, vugular or fractured earth formations having varying sizes of pores, vugs or fractures. The larger particle sizes are required for such porous formations as sand, gravels, cobbles and glacial tills. Less porous formations, such as hydratable shales, clays, and silts require smaller particle sizes. The choice of particle size is important in optimizing product efficiency in different formations. In a preferred embodiment of this invention, the particle size for the granular, flaked or agglomerated polymer ranges from 0.01 mm to 50 mm, preferably 0.01 mm to 10.0 mm, and most preferably 0.1 mm to 2.5 mm, with the majority by weight of the granules being between 0.40 mm and 2.5 mm.

All embodiments of this invention may be manufactured and used in liquid form, i.e., as an emulsion (oil-continuous or water-continuous), suspension form, dispersion form, solid form, or solution form. The preferred physical form is dry granules, flakes or agglomerates.

One preferred embodiment of this invention is a polymer with anionicity ranging from approximately 35% to approximately 65% with a molecular weight in excess of 100,000, preferably in excess of one million and most preferably in excess of ten million, as measured prior to cross-linking, which is slightly crosslinked from 0.01% to 10% using either aldehydes, $C_1$ to $C_{25}$ alkylamines including diamine and triamine, and/or methylene bis acrylamide. The polymer is either a copolymer of acrylamide and acrylic acid or maleic acid, maleic anhydride, or fumaric acid, or AMPS, styrene sulfonic acid, vinyl sulfonic acid, methallylsulfonic acid, and their salts and any combination thereof. The molar ratio of these components can vary in order to achieve the desired anionicity for the particular formation and water conditions. particle size for the granular polymer in most formation conditions should range from 0.01 mm to 10.0 mm with the majority of the particles being between 0.1 mm and 2.5 mm. A viscous earth support fluid is preferable with Marsh Funnel viscosities ranging from approximately 35 to in excess of 300 seconds depending on the reactivity and porosity of the formation, all fluids should be as non-gelling as possible to allow settling of disturbed earth solids as well as dispersion of additional fresh polymer.

EXAMPLE

A dry granular water-soluble polymer slurry of the present invention was tried under a field test in Seattle, Wash. The field test drilled over twenty soldier piles for the foundation of a building. The new dry polymer demonstrated very good performance in comparison to an industry-standard oil continuous phase emulsion polymer with an average charge density of 30% anionic, which had previously been used, and displayed advantages in controlling fluid loss to the borehole, cleaning the hole and loading the auger, simplifying polymer handling and addition, increasing drilling efficiency, and reducing polymer waste and environmental impact. This initial application of the polymer was successful and indicates that the novel dry polymer may be a valuable new tool for the foundation drilling industry.

Small quantities of a dry granular polymer of the present invention, CDP solid, and a liquid emulsion analog of the present invention, CDP Liquid, were supplied. The CDP polymer used was a sodium-form acrylate/acrylamide copolymer (a polyacrylamide) having an anionic charge density of nominally 40% and molecular weight of approximately 20 million. Of fourteen soldier pile holes, nine were drilled with the new dry polymer, CDP Solid, three were drilled with the liquid analog, CDP Liquid, and two were drilled with the industry standard 30% anionic PHPA emulsion polymer.

The soldier pile holes drilled with slurries prepared from the three different polymers ranged in diameter from 30 inches to 42 inches, and in depth from 28 feet to 42 feet. The formation was glacial till, poorly sorted, with lenses of sand, layers of silty clayey sand, and sandy silt with cobbles and gravel. Water was encountered at various depths within the boreholes, and in some holes strong water flows were encountered. One hole was a re-drilling or reaming-out of a water extraction well previously drilled on the property to help lower the water table on site.

The competitive test showed that the polymers of the invention had advantages over the conventional emulsion polymer with the dry form of the invention demonstrating advantages in ease of use. The advantages included: superior control of fluid loss to the borehole; greater ease of use by the drilling crew; reduced product requirement [the dry polymer replacing the conventional polymer emulsion on a 1:6 basis]; reduced wastage; increased rate of penetration; improved cohesive loading of drilled earth solids on the excavation tool, and reduced environmental pollution.

Although particular detailed embodiments of the apparatus have been described herein, it should be understood that the invention is not restricted to the details of the preferred embodiment. Many changes in design, configuration, and dimensions are possible without departing from the spirit and scope of the instant invention.

What is claimed is:

1. A method for the preparation and use of an earth stabilization fluid comprising:
    a) adding an aqueous based continuous phase into an earth cavity;
    b) adding an anionic polyacrylamide co-polymer having a charge density functionally effective to facilitate excavation of said earth cavity, said polymer forming a plurality of transitory, deformable masses in said continuous phase; and
    c) excavating to enlarge said cavity while a portion of said polymer is in a transitory partially-hydrated swollen state.

2. The method of claim 1 wherein said polymer is functionally effective to achieve fluid loss control in said earth cavity.

3. The method of claim 1 wherein said polymer is functionally effective to stabilize the earth adjacent to the cavity.

4. The method of claim 1 wherein said polymer is functionally effective to enhance the cohesion of earth solids to facilitate their removal from said cavity.

5. The method of claim 1 wherein said polymer is functionally effective to improve the perimeter load transfer characteristics of structural elements formed in said earth cavity.

6. The method of claim 1 wherein said polymer is added to said continuous phase while in a solid, physical state.

7. The method of claim 6 wherein said solid polymer particles range in size between 0.01 mm and 10.0 mm.

8. The method of claim 7 wherein the majority by weight of said solid polymer particles have a size between 0.10 mm and 2.5 mm.

9. The method of claim 1 wherein said polymer is composed of monomers selected from the group consisting of: acrylic acid, methacrylic acid, maleic acid, maleic anhydride, fumaric acid, itaconic acid, acrylamide, methacrylamide, N-substituted acrylamides, acrylonitrile, methyl acrylonitrile, vinyl and styrene sulfonic acid, vinyl acetate, 2-acrylamido-2-methylpropane sulfonic acid, methallylsulfonic acid, water soluble salts thereof; and combinations thereof.

* * * * *